May 18, 1965  R. F. DEHN  3,183,756
CLEARANCE, RAKE ANGLE, AND STROKE LENGTH
ADJUSTING MEANS FOR POWER SHEARS
Filed Dec. 26, 1962  7 Sheets-Sheet 1

INVENTOR.
ROY F. DEHN
BY Williams, David,
Hoffmann & Yount
ATTORNEYS

INVENTOR.
ROY F. DEHN
BY Williams, David,
Hoffmann & Yount
ATTORNEYS

May 18, 1965  R. F. DEHN  3,183,756
CLEARANCE, RAKE ANGLE, AND STROKE LENGTH
ADJUSTING MEANS FOR POWER SHEARS
Filed Dec. 26, 1962  7 Sheets-Sheet 3

INVENTOR.
ROY F DEHN
BY Williams, Davids,
Hoffmann & Yount.
ATTORNEYS

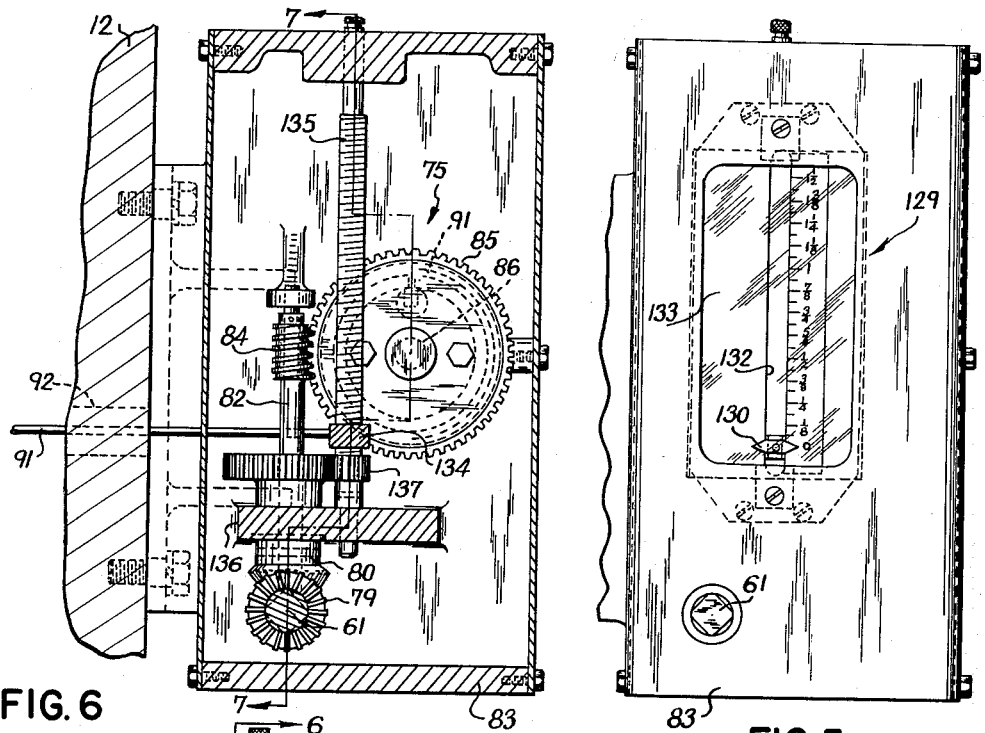
FIG. 6
FIG. 5
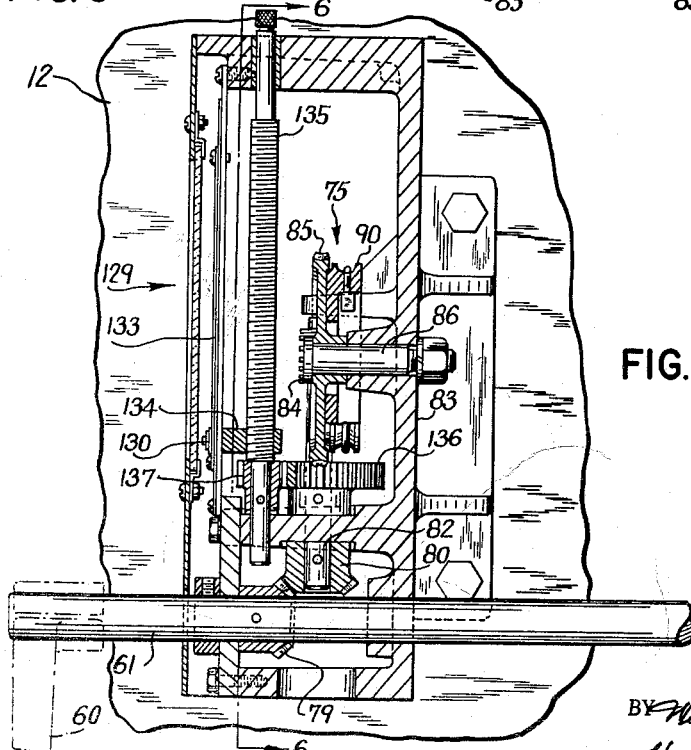
FIG. 7
INVENTOR.
ROY F. DEHN

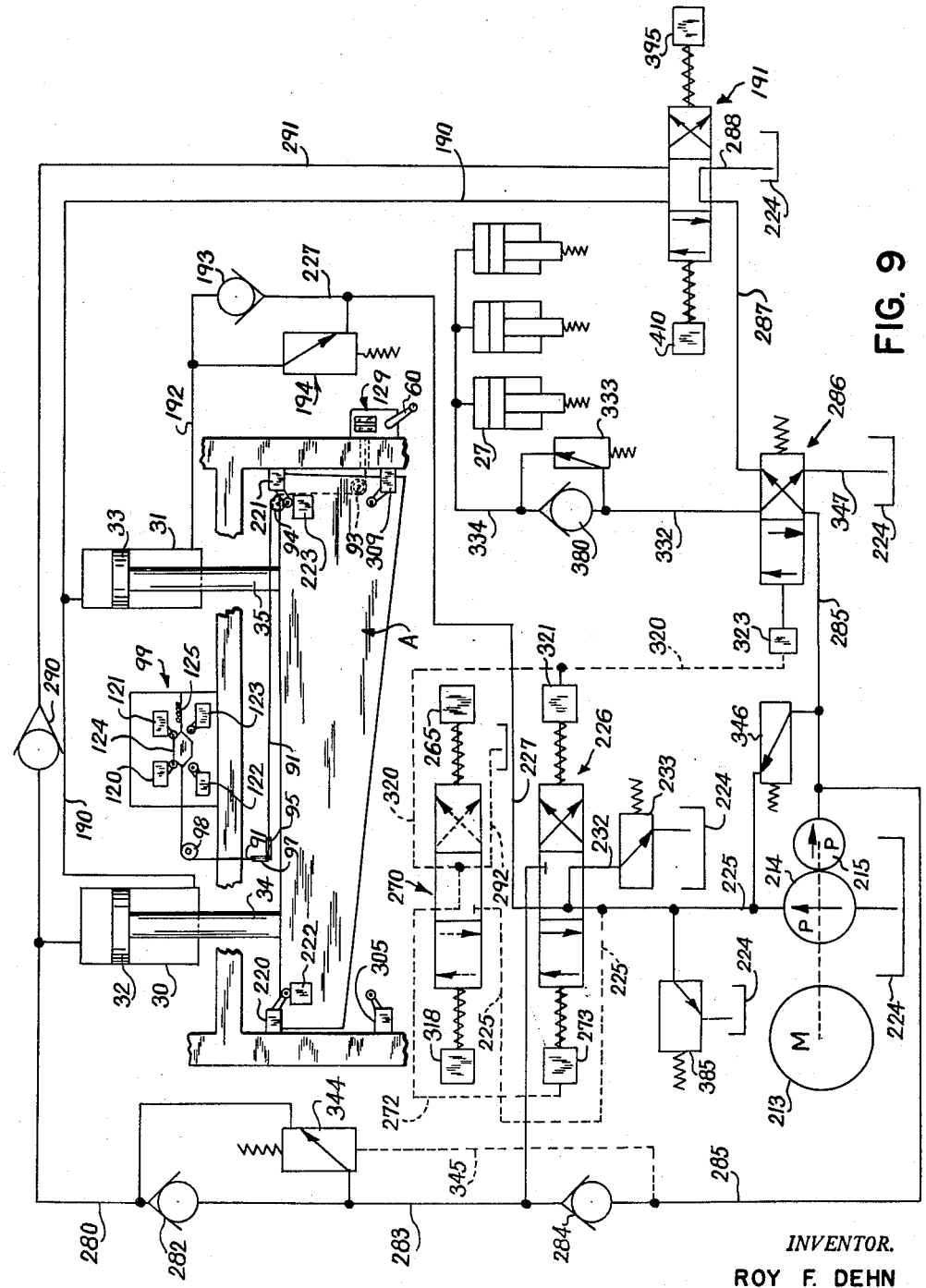

May 18, 1965 R. F. DEHN 3,183,756
CLEARANCE, RAKE ANGLE, AND STROKE LENGTH
ADJUSTING MEANS FOR POWER SHEARS
Filed Dec. 26, 1962 7 Sheets-Sheet 6

INVENTOR.
ROY F. DEHN
BY Williams, David,
Hoffmann & Yount
ATTORNEYS

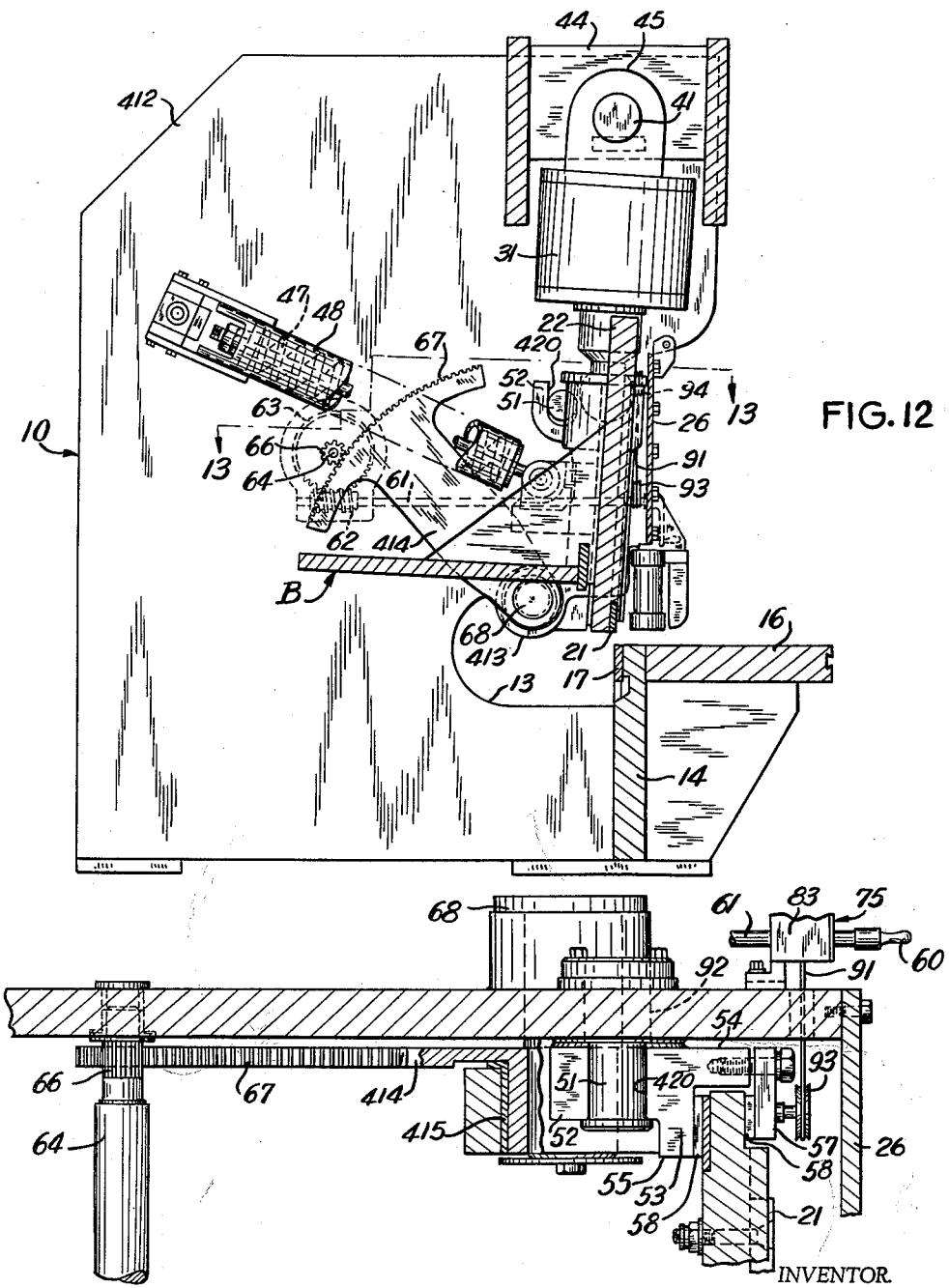

United States Patent Office 3,183,756
Patented May 18, 1965

3,183,756
CLEARANCE, RAKE ANGLE, AND STROKE LENGTH ADJUSTING MEANS FOR POWER SHEARS
Roy F. Dehn, Wickliffe, Ohio, assignor to The Cleveland Crane & Engineering Company, Wickliffe, Ohio, a corporation of Ohio
Filed Dec. 26, 1962, Ser. No. 247,406
7 Claims. (Cl. 83—530)

The present invention relates to power operated material forming machines and more particularly to power shears commonly used for cutting or shearing metal sheets and plates.

The invention contemplates the provision of a novel and improved power shear capable of shearing material having a wide range of thicknesses and incorporating means for quickly adjusting the clearance between the knife members to the optimum values for shearing material of a given thickness.

The invention also contemplates the provision of a novel and improved power shear for shearing material of different gauge or thickness and having a movable member adapted to carry a shearing knife for cooperation with a stationary knife and comprising means for quickly adjusting the clearance, the clearance angle, the rake angle and/or the stroke length of the shear to the optimum values for the particular material to be cut on any given occasion.

The invention further contemplates the provision of a novel and improved power shear for shearing material of different gauge or thickness and having a movable member adapted to carry a shearing knife for cooperation with a stationary knife and comprising means for simultaneously adjusting the clearance and clearance angle, rake angle, and/or stroke length of the shear so that the optimum knife relationship can be easily and quickly provided for shearing any particular material on any given occasion.

The invention resides in certain constructions, combinations and arrangements of parts and the advantages of the invention will be apparent to those skilled in the art to which it relates from the following description of the preferred embodiment described with reference to the accompanying drawings forming a part of this specification and in which FIG. 1 is a front elevational view of a shear embodying the present invention;

FIG. 5 is an elevational view of a portion of the shear shown in FIG. 1;

FIG. 6 is a sectional view taken approximately on the section line 6—6 of FIG. 7;

FIG. 7 is a sectional view taken approximately on the section line 7—7 of FIG. 6;

FIG. 9 is a diagrammatic view of the hydraulic system employed in the shear shown;

FIGS. 12 and 13 are views similar to FIGS. 3 and 4 showing an alternative way of supporting the guides for the movable knife assembly.

Figure 1:
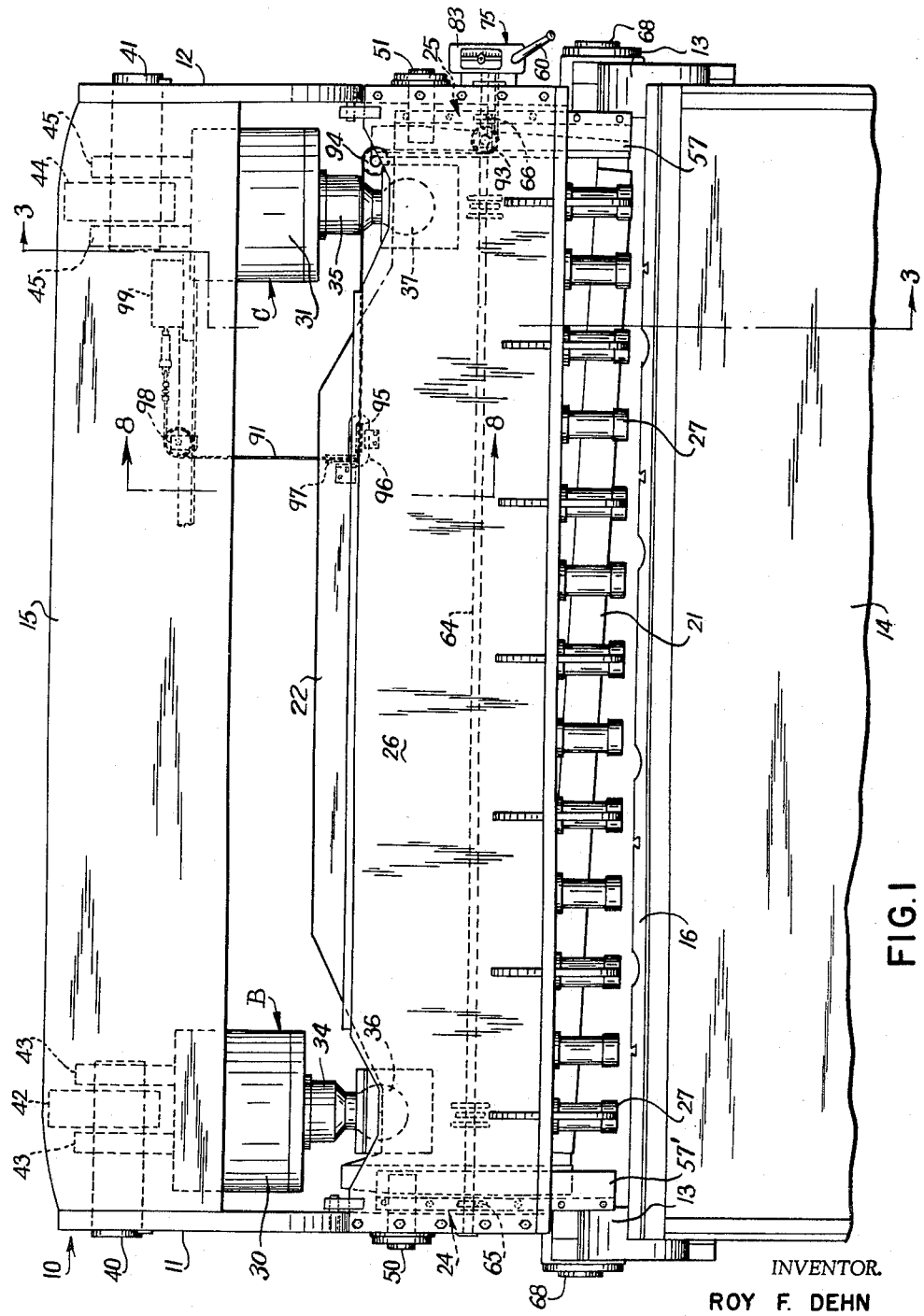

While two preferred embodiments of the invention are shown in the drawings and herein described in detail it is to be understood that there is no intention to thereby limit the invention to the specific apparatus shown.

The present invention is illustrated as embodied in a power operated shear having a frame 10 including side housings 11 and 12 provided with aligned openings 13 commonly referred to as throats. A vertical plate-like member 14 extends across the front of the shear between the side housings 11 and 12 and is welded to the lower front edges of the side housings 11 and 12. A support structure or crown 15 extends between the upper portions of the side housings 11 and 12 and supports certain operating mechanisms to be described hereinbelow. A horizontally extending work support or table 16 is secured to the plate 14 and to forwardly extending portions of the side housings 11 and 12 adjacent the lower front portions of the openings 13 and is adapted to support material to be cut by the shear.

In the embodiment illustrated the shearing operation is performed by a stationary knife member 17 adjustably secured to the plate 14 at the upper rear edge thereof and which cooperates with a movable knife member 21 connected to the lower front edge of a heavy plate 22 forming a part of a movable elongated member or blade, generally designated A. The blade A is moved through work and return strokes, by suitable power means, in the present instance a pair of reciprocating type double acting fluid pressure motors, designated generally by reference characters B and C. During the work stroke the blade A moves the knife 21 into engagement with material positioned on support 16 between the knife members 17 and 21. Opposite ends of the blade A are engaged in guide means 24 and 25, respectively, and slide therein when moved by the power means.

A vertical plate 26 secured to the side housings 11 and 12 extends between the housings above support table 16 and in front of the blade A. The lower portion of the plate 26 has a plurality of hydraulic hold-down devices 27 suitably secured thereto. The hold-down devices 27 are adapted to be actuated to engage and clamp the sheet to be cut to the top of the support 16 prior to engagement of the sheet by the movable knife member 21 to thereby hold the sheet so that it will not move when engaged by knife 21.

The hydraulic motors B and C for moving blade A in the guide means 24 and 25 include cylinder members 30 and 31, respectively, the upper ends of which are pivotally connected to the frame of the shear. The cylinders 30 and 31 of the motors B and C, respectively, have pistons 32 and 33, respectively, movable therein. Piston rods 34 and 35, which may be adjustable in length, if desired, extend from the pistons 32 and 33, respectively, and are connected by ball and socket connections 36 and 37, respectively, to opposite ends of the blade A. The ball and socket connections 36 and 37 form universal connecting means permitting the blade A to pivot freely with respect to the piston rods 34 and 35.

The hydraulic cylinders 30 and 31 are pivotally connected to the frame of the shear by pivot pins 40 and 41, respectively. The pin 40 is fixedly secured in the side housing 11 and extends from the side housing parallel to knife member 17 through bracket member 42, forming part of the crown of the frame 10 of the shear. The pin 40 also extends through a pair of vertically extending members 43 welded to the upper end of the hydraulic cylinder 30 and which lugs straddle bracket member 42. The members 43 are rotatable upon the pin 40 and permit the hydraulic cylinder 30 to pivot about the axis of pin 40. In a similar manner the pin 41 is fixedly secured in the side housing 12 and in a member 44 at the opposite side of the frame of the shear and in alignment with pin 40. The pin 41 extends through member 44 and through a pair of vertically extending members 45 which are welded to the upper end of the hydraulic cylinder 31 and which straddle bar member 44.

Upon operation of the fluid motors B and C plate 22 and knife 21 are moved downwardly and knife 21 cooperates with the stationary knife 17 to shear material placed therebetween. Suitable adjustable counterbalance springs 47 enclosed within tubular members 48 and operatively connected to opposite ends of blade A and to the frame 10 counterbalance the weight of the movable blade A. One end of the other counterbalance spring is secured to the right end of blade A as viewed in FIG. 1 and the other end to the frame 10.

The guide means 24 and 25, which guide the movement of the blade A, are of identical construction and are channel-like, having substantially the shape of a U in transverse cross-section. The left end of the blade A, as viewed in FIG. 1, projects into the channel of guide means 24 while the right end of the blade A projects into the channel of guide means 25. As shown in FIGS. 1 to 4, the guide means 24 and 25 are pivotally mounted in the side members 11 and 12 of the frame of the shear by pins 50 and 51, respectively, which are located above knife 17 and extend parallel thereto. The pin 51 is fixedly secured in the side housing 12 of the shear and extends through an opening in boss 52 of guide means 25, as shown in FIG. 4. The boss 52 of the guide means 25 is preferably rotatably mounted on pin 51 and is welded to or otherwise made integral with an elongated L-shaped member 53. The L-shaped member 53 extends generally vertically and includes legs 54 and 55. The boss 52 is connected to and projects from the leg 55 in a direction opposite the direction in which the leg 54 extends therefrom. A plate 57 is bolted to the leg 54 of the L-shaped member and extends perpendicular to the leg 54 and in the same direction as leg 55. The end of the blade A is located in the channel of the guide means 25 between the plate 57 and leg 55 of the L-shaped member 53 and is slidable therein. The pin 50 is fixedly secured in the side housing 11 and the guide means 24 is pivotally mounted thereon in the same way guide means 25 is mounted on pin 51. Since the guide means 24 and 25 are similar in construction and function in the same manner, guide means 24 will not be described. In the drawings the same reference characters are used to designate the parts of guide means 24 as are used to designate the corresponding parts of the guide means 25 but with a prime mark affixed thereto.

The U-shaped guide means 24 and 25 are provided with plates 58 made of suitable bearing material and secured to the adjacent or inner surfaces of leg 55 and plate 57, respectively. The plates 58 snugly engage opposite surface portions of the ends of the blade A and yet permit the blade to freely slide in the guides. Upon pivotal movement of the guide means 24 and 25 about pins 50 and 51 the plates 58 will move causing the blade A and the knife member 21 to be pivoted about the axes of pins 50 and 51. This pivoting movement permits a change or adjustment in the clearance between the knife members 17 and 21, that is, the distance between the knife members 17 and 21 during the shearing operation can be either increased or decreased, depending upon the direction in which the guides are pivoted. If the guides are moved in a clockwise direction about pins 50 and 51 as viewed in FIG. 3 the clearance is increased, while if the guides are moved in a counterclockwise direction about pins 50 and 51, as viewed in FIG. 3, the clearance is decreased.

The guides 24 and 25 are simultaneously moved or adjusted about pins 50 and 51 by means including a crank 60. Manual rotation of the crank 60 causes shaft 61 to which it is connected to be rotated. A worm gear 62 mounted on shaft 61 is in driving engagement with a suitable gear 63 in a gear box connected to the side housing 12. The gear is connected to a shaft 64 extending between the side housings 11 and 12 in a direction parallel to the length of the knife member 17 and carries a pair of pinions 65 and 66 spaced therealong, as shown in FIG. 1. Pinion 66 operates a suitable mechanism for pivoting guide 25, which mechanism includes a sector gear 67 in mesh with pinion 66. The sector gear 67 is rotatably mounted on a stud shaft 68 rotatably secured in the side housing 12 and has an eccentric means 69 thereon. One end of a link member 70 encircles eccentric means 69 and the other end of the link member 70 is pivotally connected to guide means 25 by means of a pivot pin 72 which is mounted in member 53 at a point located below pin 51. Upon rotation of the crank 60 the sector gear 67 is rotated, thereby causing the eccentric 69 to move the link 70 in a direction generally perpendicular to the direction of movement of the knife member 21. This causes the guide 25 to pivot about pin 51 on which it is mounted. The pinion 65 operates a suitable mechanism for pivoting guide means 24, which mechanism is not shown on the drawings but which is similar in construction to the mechanism described for pivoting guide means 25 and is simultaneously operated with the mechanism for pivoting guide 25.

Figure 2:
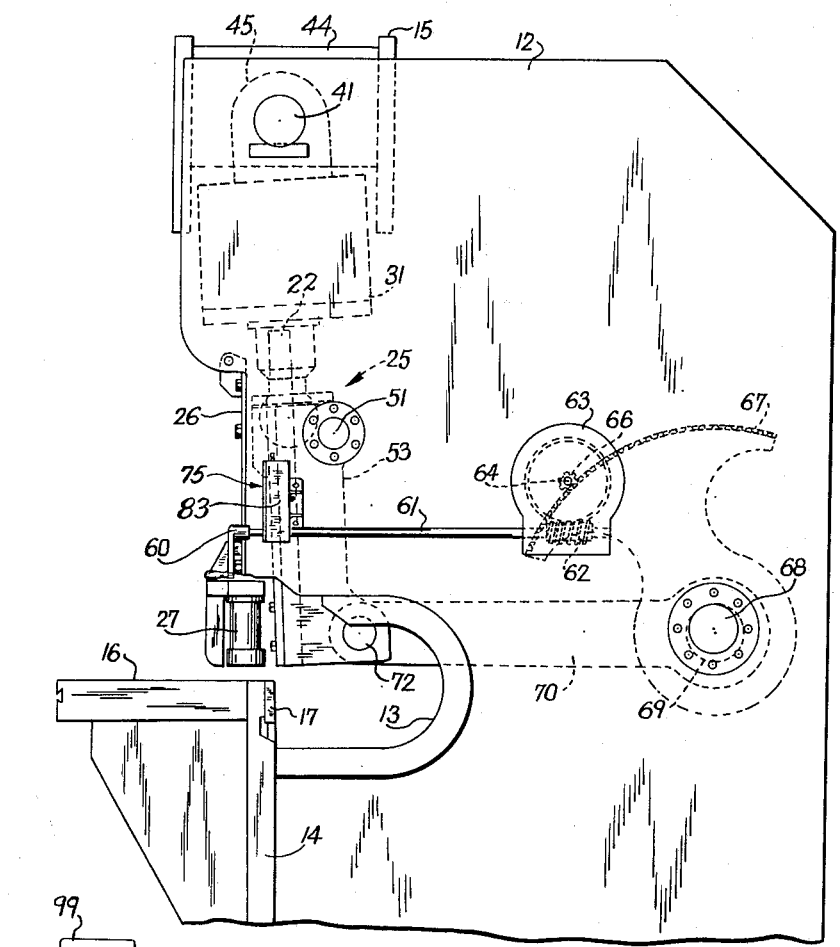
FIG. 2 is an end elevational view of the shear shown in FIG. 1 looking at the shear of FIG. 1 from the right.
Figure 3:
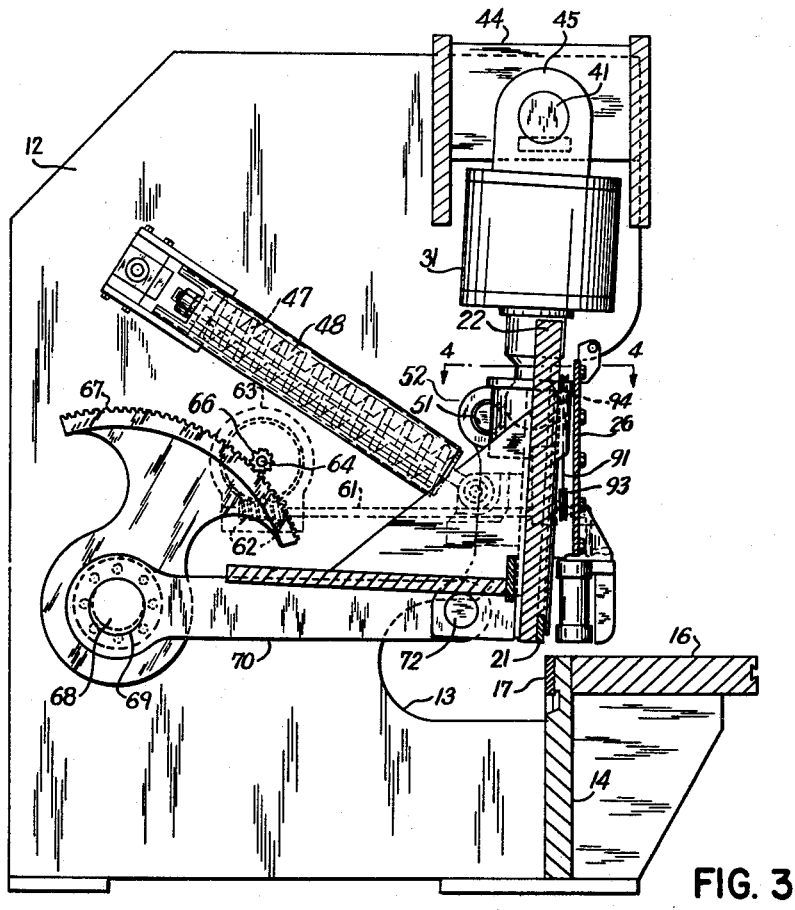
FIG. 3 is a sectional view with certain parts in elevation and certain parts removed taken approximately on the section line 3—3 of FIG. 1.
Figure 4:
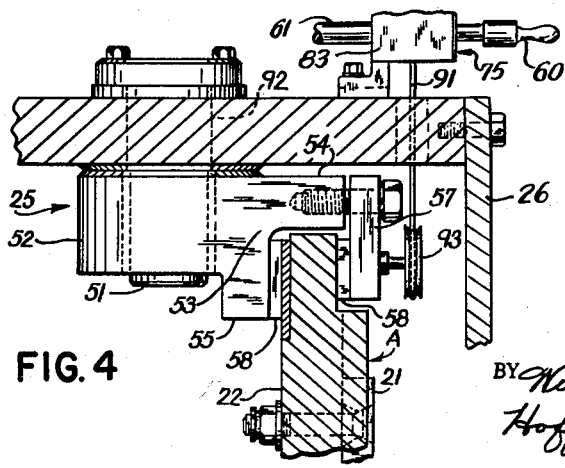
FIG. 4 is a sectional view taken approximately on the section line 4—4 of FIG. 3.

The simultaneous operation of the mechanisms which cause guide means 24 and 25 to pivot, causes the knife member 21 carried by the plate 22 of the movable blade assembly A, which is engaged in the guides, to also be pivoted, thereby causing the distance between the stationary knife member 17 and the movable knife member 21, as viewed in FIGS. 1, 2 and 3, and the angle at which the knife member 21 approaches and passes by the knife member 17 to be changed. The distance and angle are commonly referred to as the knife clearance and clearance angle, respectively, and are extremely important to the proper shearing of material and are changed to provide the optimum blade position for shearing material of a given thickness.

The elongated movable knife member 21 preferably is inclined lengthwise with respect to knife member 17 to provide a shearing action upon movement of the knife member 21 in a downward direction. The angle or inclination of the movable knife member with respect to the stationary knife member or the horizontal is called the rake angle. Since the hydraulic motors B and C may be operated differently and because the lower end of the piston rods 34 and 35 are pivotally attached to the blade A, the movable knife 21 can pivot with respect to the stationary knife 17 about an axis perpendicular to the plane of the plate 22 and/or maintained in a predetermined attitude or angular relationship to the stationary knife 21 by proper control of the fluid pressure motors. In the embodiments illustrated this is accomplished by a rake angle adjustment mechanism 75. Sufficient clearance is provided at the ends of the blade A to permit rake angle adjustment. The crank 60 is operatively connected to the rake angle adjustment mechanism 75, and rotation of the crank 60 to adjust the clearance and clearance angle between the stationary and movable knife members 17 and 21 also actuates the adjustment mechanism 75, which in turn effects a change or adjustment in the rake angle.

Figure 8:
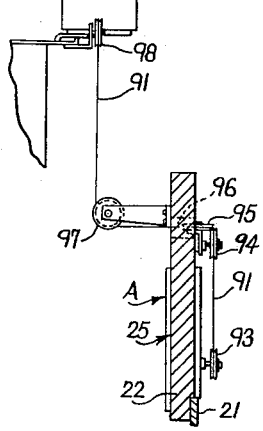
FIG. 8 is a sectional view with parts omitted of the shear of FIG. 1 taken approximately on the section line 8—8 thereof.

The rake angle adjustment mechanism 75 controls the operation of fluid motors B and C to effect the rake angle adjustment and includes a first bevel gear 79 fixedly secured to the shaft 61 and in mesh with a second bevel gear 80 fixedly secured on the lower end of a vertically extending shaft 82 rotatably mounted in a housing 83 bolted to the frame of the shear. A worm gear 84 mounted on shaft 82 meshes with a worm wheel 85 rotatably mounted on a stud shaft 86 secured in the housing 83. Also mounted on the stud shaft 86 is grooved drum or sheave 90 connected with the worm wheel 85 and rotatable therewith. A nonelastic flexible wire or other suitable member 91 adapted to be wound onto or off of the drum 90 is secured at one end to the drum 90 and after first extending around the drum 90, passes horizontally out of the housing 83 and through an opening 92 in side housing 12 of the frame and then around sheave 93 rotatably mounted on plate 57 of guide means 25, as shown in FIG. 4. The flexible wire 91 after passing around sheave 93 extends vertically around sheave 94 rotatably mounted on the front surface of the blade A to the right of ball and socket connection 37, and from sheave 94 the wire 91 extends horizontally a considerable distance and then passes around sheave 95 rotatably mounted on the blade A to the left of ball and socket connection 37 as viewed in FIG. 1. The wire 91 extends horizontally from sheave 95 and perpendicular to the blade A through an opening 96 in the blade to sheave 97 mounted on the rear side of the blade A. This structure is best shown in FIG. 8. The wire 91 extends vertically from the sheave 97 and around sheave 98 mounted on the frame 10 of the shear, and from sheave 98 the wire extends horizontally to a rake angle or attitude controller means 99 to which it is connected. The controller means 99 when actuated controls the supply of fluid to motors B and C in a manner to provide adjustment of the rake angle.

The controller means 99 may be of any suitable construction and is shown in FIG. 9 as preferably comprising four clustered electric switches, designated 120, 121, 122 and 123. The electric switches are adapted to be selectively energized by a cam member 124 which is located centrally of the switches and operatively connected to the wire 91. When the wire 91 is wound onto drum 90 the wire 91 is tensioned or pulled which causes the cam member 124 to be drawn or moved to the left as viewed in FIG. 9 and when the wire 91 is wound or reeled off drum 90 the wire 91 is slackened which permits the cam member 124 to move to the right, as viewed in FIG. 9 under the action of a tension spring 125.

The actuating members of the electric switches 120 and 121, when the cam member 124 is in its neutral or nonactuating position, are merely in engagement, or approximately so, with the cam member 124, as shown in FIG. 9, but the switches 120 and 121 are not actuated thereby. When the cam member 124 is moved to the left, as viewed in FIG. 9, the switch 121 will be actuated, that is, closed in the present embodiment. If the cam member 124 is moved to the right, as viewed in FIG. 9, the switch 120 will be actuated, that is, also closed in the embodiment shown. The switches 122 and 123 are normally closed and are opened by the cam member 124 after a predetermined amount of movement of the cam member in either the right or left directions, respectively, as viewed in FIG. 9. The function of these switches will be apparent from the description of the hydraulic and electrical systems hereinbelow.

A material thickness indicator 129 settable to the thickness of the material to be cut is supported by the housing 83 and includes a pointer 130 movable in a slot 132 in a plate 133. The plate 133 is provided with a plurality of marks each of which indicates a different plate or material thickness. The pointer 130 is mounted on an internally threaded sleeve 134 which is threaded on a vertically extending shaft 135 rotatably mounted in the housing 83 and threaded to receive the sleeve 134. The shaft 135 is rotated by a gear 136 mounted on shaft 82 and in mesh with pinion 137 mounted on shaft 135. Upon rotation of the crank 60 the pointer 130 will move vertically in the slot 132.

When adjusting the shear the operator rotates crank 60 until the pointer 130 points to the thickness of the material to be cut. This rotation of the crank 60 causes operation of the mechanisms which pivot guide means 24 and 25, as aforementioned, to change the knife clearance and clearance angle and to simultaneously rotate the drum 90, causing the wire 91 to be wound upon the drum 90 or to be wound off the drum 90, depending on the direction of rotation of the crank 60. The wire 91 thereby moves the cam member 124 or permits it to move to actuate switch 120 or 121, thereby causing the controller means 99 to effect adjustment of the rake angle. The clearance, clearance angle and rake angle are thus quickly set at the optimum values for the particular thickness of material being cut, as designated by pointer 130. The gearing, of course, must be suitably selected to provide a predetermined amount of rotation to the sector gears 66 and drum 90 for any given vertical movement of the pointer 101. This selection of gearing and gear ratios is well within the purview of one skilled in the art. The wire 91 also must be positioned on or connected to the blade A to provide the proper amount of movement of the cam 124 for any given change in the rake angle of the blade A so that the cam 124 will be returned to its neutral position, when the changed or new rake angle of the blade A has been reached. The counterbalancing springs 47 are inclined inwardly with respect to the plate 22 of the blade A and in addition to counterbalacing the blade A remove any clearance in the blade guides and their operating mechanism which might cause inaccuracies in the blade clearance indicating mechanism.

Figure 10:
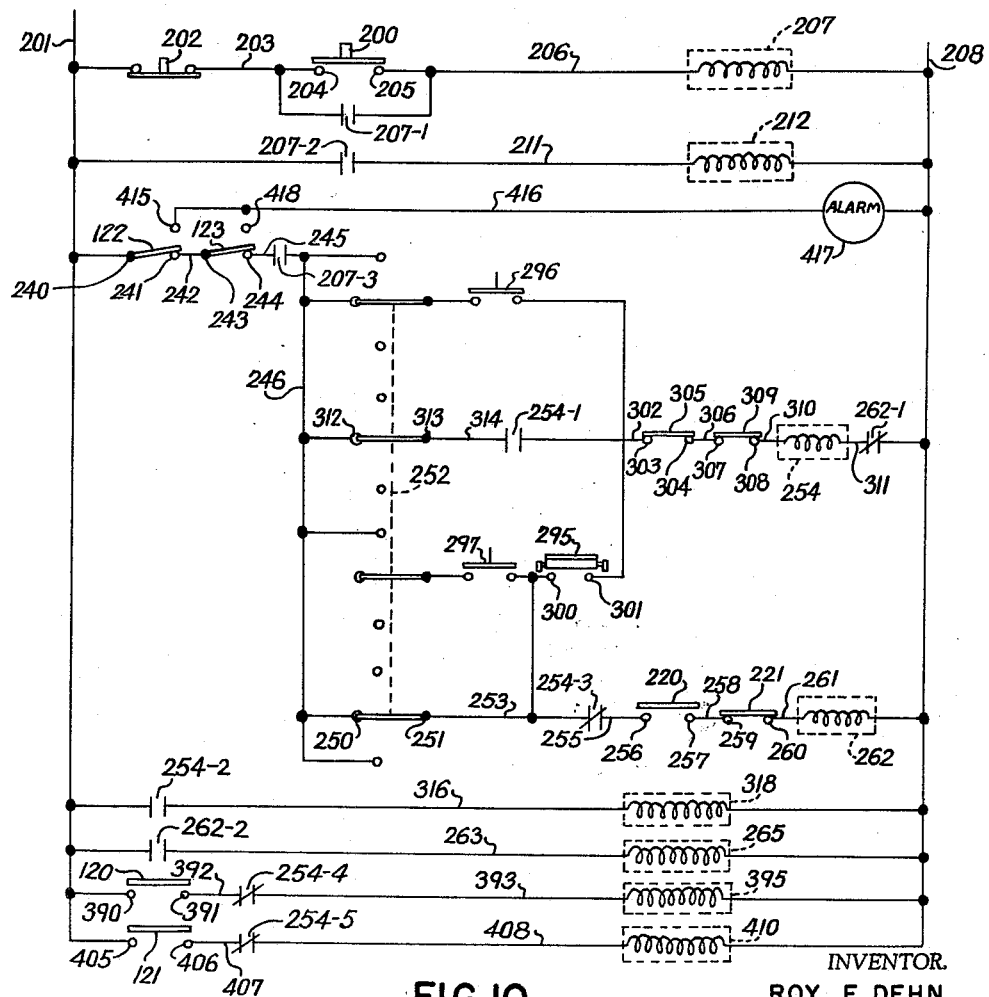
FIG. 10 is a diagrammatic view of the electrical system employed in the shear shown.

Referring to FIGS. 9 and 10, and assuming that the shear is at rest with the blade A in its up or partially up position and the movable knife at its normal maximum rake angle, shown in FIG. 9, that all valves and solenoids are in their normal positions, and that all hydraulic conduits are filled with hydraulic fluid, the blade A is then being held in the position referred to by the hydraulic fluid trapped in the lower end of cylinder 30 and the upper end of cylinder 31 which are connected by conduit 190 closed at a three position, four-way, solenoid operated valve 191 normally spring biased to its center position, and in the lower end of cylinder 31 connected to conduit 192 closed at a check valve 193 and an adjustable spring loaded relief valve 194 adjusted to open at a pressure slightly in excess of that required to hold the blade A in an elevated position. Such a pressure might be about 150 to 250 pounds per square inch. The shear is first conditioned for operation by the operator pressing the start switch 200. This completes a circuit from the power line 201 through normally closed stop switch 202, conductor 203, now closed contacts 204 and 205 of the start switch 200, conductor 206 and relay 207 to the power line 208. Energization of the relay 207 causes the normally open contacts 207-1, 207-2 and 207-3 of relay 207 to close. The closing of contacts 207-1 of relay 207 causes a holding circuit to be established around switch 200, after which the operator may release the switch 200 without de-energizing relay 207. Closing of the contacts 207-2 of the relay 207 causes a circuit to be completed from the line 201 through now closed contacts 207-2 of relay 207, conductor 211 and motor controller 212 for the motor 213 to the power line 208. This causes operation of the motor 213 which drives pumps 214 and 215.

When the blade A is in its topmost position and at its normal maximum rake angle, the closing of contacts 207-3 of relay 207 performs no function because one or the other of the blade up limit switches 220 and 221 are open having been opened by their respective cam members 222 and 223 carried by the blade A. The up limit switches 220 and 221 are secured to the frame of the shear and the cam members 222 and 223 which actuate the respective switches are mounted on the blade A. The switches 220 and 221 are preferably adjusted such that the switch 220 opens just before the cam 223 actuates the switch 221, with the blade A at its normal maximum rake angle. The switches 220 and 221, however, may be adjusted to open simultaneously, if desired. Since the switches 220, 221 are in series circuit with contacts 207–3, the closing of contacts 207–3 completes no circuit at this time, and energization of pump 214 upon the closing of contacts 207–2 of the relay merely causes hydraulic fluid to be pumped from the reservoir 224 through conduit 225 into a three position, four way, fluid pressure operated valve 226 spring biased to its center position. Since the valve 226 is in its center position, as shown in FIG. 9, conduit 225 is connected to conduit 227 leading to check valve 193 and the spring loaded valve 194 but the pressure at this time is not sufficient to open check valve 193 because conduit 225 is at this time connected to the sump through valve 226, conduit 232 and a spring loaded valve 233 set to open at a pressure less than that required to overcome the pressure in conduit 192 and raise the blade A, such as about 50 to 60 pounds per square inch, depending, of course, upon the size and weight of the cylinders 30 and 31 and the blade A, respectively.

If the blade A is not in its topmost position, the closing of contacts 207–3 completes a circuit from power line 201 through contacts 240 and 241 of switch 122, conductor 242, contacts 243 and 244 of switch 123, conductor 245, now closed contacts 207–3 of relay 207, conductor 246, contacts 250 and 251 of selector switch 252, conductor 253, normally closed contacts 254–3 of relay 254, conductor 255, contacts 256 and 257 of switch 220, conductor 258, contacts 259 and 260 of switch 221, conductor 261 and relay 262 to power line 208. Energization of relay 262 causes normally closed contacts 262–1 of relay 262 to open and normally open contacts 262–2 of relay 262 to close. Opening of contacts 262–1 prevents simultaneous operation of relay 254 with relay 262. Closing of contacts 262–2 completes a circuit from power line 201 through now closed contacts 262–2 of relay 262, conductor 263, and solenoid 265 to power line 208.

Solenoid 265 is connected to a three position, four way solenoid operated pilot valve 270 spring biased to its center position and energization of the solenoid 265 moves valve 270 to the right as viewed in FIG. 9. Movement of valve 270 to the right causes fluid to flow from conduit 225 through valve 270, and conduit 272 into hydraulic cylinder 273 of valve 226, causing the valve 226 to move to the right. Movement of valve 226 to the right disconnects conduit 225 from conduit 232 and reconnects it to conduit 227 causing high pressure hydraulic fluid to be pumped through conduit 225, valve 226, conduit 227, check valve 193, conduit 192, into the bottom of cylinder 31. This causes the piston 33 to rise in cylinder 31, thereby forcing fluid from the top thereof through conduit 190 into the bottom of cylinder 30. This fluid cannot flow through conduit 190 and the four way, three position solenoid operated valve 191 because this valve when in its center or neutral position blocks the flow of fluid therethrough. The flow of fluid into the bottom of cylinder 30 causes piston 32 to rise therein.

The piston heads in cylinders 30 and 31 move upwardly equal amounts because the relative sizes of cylinders 30 and 31 and the piston rod 34 in the cylinder 30 is such that the volume of fluid under piston head 32 in cylinder 30 is equal to the volume of fluid above piston head 33 in cylinder 31 for any given increment of length. By way of example, when piston head 33 in cylinder 31 moves upwardly one inch, thereby forcing a volume of fluid from the top of cylinder 31 and into the bottom of cylinder 30, the piston head 32 therein also moves upwardly one inch.

The upward movement of the piston head 32 causes the fluid in the top of cylinder 30 to flow through conduit 280, check valve 282, conduit 283, check valve 284, conduit 285, two position, four way hydraulically operated valve 286 normally spring biased to the position shown in FIG. 9, conduit 287, two position, four way solenoid operated valve 191 normally spring biased to neutral position, shown in FIG. 9, and conduit 288 into the reservoir. Fluid will also flow from the conduit 283 through valve 226, conduit 232 and valve 233 to the sump if the pressure is sufficient to open valve 233. The fluid cannot flow through conduit 280 toward three position, solenoid operated valve 191 because of a check valve 290 therebetween and a conduit 291 connected to the valve 191, which check valve blocks the flow of fluid through conduit 280 in that direction.

As the piston heads 32 and 33 move upwardly the blade A and cam members 222 and 223 mounted on the blade move therewith. Engagement of either switch 220 or 221 by cam member 222 or 223, respectively, causes the switch to open and break the circuit to relay 262 permitting contacts 262–2 thereof to open thereby de-energizing solenoid 265. De-energization of solenoid 265 allows valve 270 to return to its center position in which fluid is drained from hydraulic cylinder 273 of valve 226 through conduit 272, valve 270 and conduit 292 into the sump reservoir. The valve 226 returns to its center position upon the release of pressure fluid from hydraulic cylinder 273 and upon return of the valve 226 to its center position hydraulic fluid is pumped by pump 214 through conduit 225, valve 226, conduit 232 and spring loaded valve 233 into the reservoir 224 as previously explained.

During the operations thus far described the pump 215 discharges its fluid through conduit 285, valve 286, conduit 287, valve 191, and conduit 288 into the reservoir or sump 224.

It is apparent from the above description that when the shear is started the blade A will immediately move to its topmost position unless, of course, it is already there.

The control circuit for actuating the shearing operation includes the three position selector switch 252, aforementioned, by which different operations of the shear can be selected. When the selector switch 252 is in one position, hereinafter referred to as the single stroke or middle position, the shear will operate to execute a single stroke, nonrepeat cycle upon the depressing of a normally open pedal switch 295 to close the same, regardless of whether or not the operator keeps his foot on the switch or releases it immediately after the down stroke of the blade A has begun. When the selector switch 252 is in the second or down position hereinafter referred to as the jog position, the blade A will move down as long as the operator maintains his foot on the pedal switch 295 and will move up when the operator releases the pedal switch 295. When the selector switch 252 is moved to the third or up position, hereinafter referred to as the inch position, the blade A can be inched down by the manually operable down push button switch 296 or inched up by the manually operable up push button switch 297. The various push button switches mentioned may be located at any convenient place on or about the machine for easy accessibility by the operator. While the shear may be operated in any of the three different ways mentioned, as determined by the position of the selector switch 252, the operation of the shear will be described only with reference to the middle position of the selector switch. The operation of the shear for other positions of the selector switch is substantially the same as the operation when the selector switch is in its middle position, and will be obvious to those skilled in this art.

With the motor 213 operating, the blade A in its raised position at its normal maximum rake angle, and the selector switch 252 in its middle position, that is, the single stroke position, the operator initiates a shearing operation by depressing the pedal switch 295. Depressing of switch 295 closes its normally open contacts 300 and 301 thereof which completes a circuit from the power line 201 through contacts 240, 241 of switch 122, conductor 242, contacts 243 and 244 of switch 123, conductor 245, now closed contacts 207-3 of relay 207, conductor 246, contacts 250 and 251 of the selector switch 252, conductor 253, now closed contacts 300 and 301 of the pedal operated switch 295, conductor 302, now closed contacts 303 and 304 of blade down limit switch 305, conductor 306, now closed contacts 307 and 308 of blade down limit switch 309, conductor 310, relay 254, conductor 311 and normally closed contacts 262-1 of relay 262 to the power line 208. Energization of the relay 254 causes normally open relay contacts 254-1 and 254-2 to close and normally closed relay contacts 254-3, 254-4 and 254-5 to open. The opening of contacts 254-3, 254-4 and 254-5 performs no function at this time.

The closing of the contacts 254-1 of relay 254 causes a holding circuit for the relay to be completed from the conductor 246 through contacts 312 and 313 of selector switch 252, conductor 314, now closed contacts 254-1 of relay 254, conductor 302, now closed contacts 303 and 304 of switch 305, conductor 306, contacts 307 and 308 of switch 309, conductor 310, relay 254, conductor 311 and normally closed contacts 262-1 of relay 262 to the power line 208. If the operator now removes his foot from the foot pedal switch 295 the relay 254 will remain energized. Closing of contacts 254-2 of the relay 254 completes a circuit from the power line 201 through now closed contacts 254-2 of relay 254, conductor 316 and solenoid 318 to the power line 208.

The solenoid 318 is connected to valve 270 and energization of solenoid 318 results in the solenoid moving the valve 270 toward the left as viewed in FIG. 9. Movement of the valve 270 to the left causes hydraulic fluid to be pumped by the pump 214 through conduit 225, valve 270, and conduit 320 into hydraulic cylinder 321 of valve 226, moving valve 226 to the left as viewed in FIG. 9, and into hydraulic cylinder 323 of valve 286, moving valve 286 to the right.

Movement of valve 286 to the right causes the pump 215 to pump fluid from the reservoir 224 through the conduit 285, valve 286, conduit 332, adjustable pressure reducing valve 333, and conduit 334 into the top portion of the cylinders of the hydraulic hold-down devices 27. Movement of the valve 226 to the left causes the pump 214 to pump fluid through conduit 225, valve 226, now moved to the left, conduit 283, check valve 284, conduit 285, valve 286, conduit 332, adjustable reducing valve 333 and conduit 334 into the hold-down devices 27. Both pumps, therefore, cause the hold-down devices to move downwardly to engage the material to be cut. Subsequent to the hold-down devices engaging the material to be sheared pressure builds up in the conduits 283 and 285 and more particularly in conduit 285. When a predetermined pressure has been built up in the hydraulic system for the hold-down devices 27, an adjustable hydraulic operated valve 344 connected by control conduit 345 to conduit 285 opens.

Valve 344 is connected to conduits 280 and 283 at opposite sides of check valve 282 and the opening of valve 344 allows fluid to flow from conduit 225 through valve 226, conduit 283, valve 344 and conduit 280 into the top of hydraulic cylinder 30, causing the piston head 32 therein and the left-hand end of the blade to move downwardly. Fluid from pump 214 will not flow through check valve 284 into conduit 285 at this time, because there is a relatively higher pressure built up in conduit 285 holding the check valve 284 closed.

Upon the pressure in conduit 285 reaching a predetermined point, which is only slightly greater than the pressure which causes valve 344 to open, an adjustable sequence valve 346 opens and fluid from pump 215 flows from the conduit 285 through the adjustable sequence valve 346 into the main stream of hydraulic fluid in the conduit 225 thus assisting pump 214 in moving piston head 32 in cylinder 30 downwardly.

Downward movement of the piston head 32 in cylinder 30 causes hydraulic fluid to be forced from beneath the piston head through conduit 190 and into the top of the hydraulic cylinder 31 since flow of fluid through valve 191 is blocked, the valve being in its center position. This causes the piston head 33 in cylinder 31 to move downwardly. The piston heads in the cylinders 30 and 31 move downwardly at equal speeds and therefore cause both ends of the blade to move downwardly at a uniform speed. This results because of the relative sizes of cylinders 30, 31 and the piston rod 34, as aforementioned. The downward movement of piston head 33 causes the fluid under the piston head 33 in the bottom portion of the hydraulic cylinder 31 to move through the conduit 192, adjustable valve 194, normally set to hold the pistons 32 and 33 and the blade A from dropping when the motor 213 is stopped, conduit 227, valve 226, conduit 232 and check valve 233 into the reservoir.

When the blade A moves downwardly a small distance, whichever of the up limit switches 220 and 221 was open at the initiation of the movement, closes because of the downward movement of the cam members 222 and 223 along with the blade A. This, however, does not perform any function at this time because the up limit switches are in series circuit with the normally closed but now open contacts 254-3 of relay 254. The cam members 222 and 223 are also adapted to engage and actuate the normally closed down limit switches 305 and 309, respectively, to open these switches upon the respective ends of the blade A reaching predetermined down positions. The down limit switches 305 and 309 are positioned in such a manner that when the blade is at the normal maximum rake angle, shown in FIG. 9, cam member 223 will engage switch 309 slightly before cam 222 reaches switch 305 on the downstroke. The switches and cams, however, may be positioned to open the down limit switches simultaneously, if desired.

The blade A will continue to move down until it reaches its down position, since the blade is at its normal maximum rake angle, cam 223 will actuate switch 309, opening the contacts 307, 308 thereof and breaking the circuit to the relay 254. Deenergizing of the relay 254 will cause normally open relay contacts 254-1 and 254-2 to open and normally closed relay contacts 254-3, 254-4 and 254-5 to close. Opening of the relay contacts 254-1 provides no function at this time since these contacts are in the circuit which has already been broken by the opening of switches 309. Opening of relay contacts 254-2 causes the solenoid 318 to be de-energized. Closing of contacts 254-4 and 254-5 performs no function at this time.

The opening of contacts 254-2 of relay 254 breaks the circuit for solenoid 318 connected to valve 270, which allows the valve to return to its central position and reconnect conduits 272 and 320 to conduit 292 and in turn the sump 224, whereupon the hydraulic fluid flows out of the hydraulic cylinder 321 of valve 226 and hydraulic cylinder 323 of valve 286 through conduit 320, valve 270 and conduit 292 into the reservoir and valves 226 and 286 return to their central or normal positions shown in FIG. 9. The return of valve 226 to its central position reconnects conduit 225 leading from pump 214 to conduit 232 and through valve 233 to the sump.

The release of pressure fluid from hydraulic cylinder 323 and the return of valve 286 to the position shown in FIG. 9 directs hydraulic fluid from pump 215 through the conduit 285, valve 286, conduit 287 and valve 191 into the reservoir. At the same time the hydraulic fluid in the hold-down devices 27 is returned to the reservoir through the conduit 334, check valve 380, conduit 332 and valve 286 and conduit 347, which is connected to the reservoir, thereby releasing the hold-down devices from engagement with the material which was cut. At this time fluid may also flow from the top of cylinder 30 to the sump or reservoir 224 by way of conduit 280, check valve 282, conduit 283, check valve 284, conduit 285, valve 286, conduit 287, valve 191 and conduit 288, as previously explained.

The closing of contacts 254–3 causes a circuit to be completed from conductor 246 through contacts 250 and 251 of selector switch 252, conductor 253, now closed contacts 254–3 of relay 254, conductor 255, now closed contacts 256 and 257 of up limit switch 220, conductor 258, now closed contacts 259, 260 of up limit switch 221, conductor 261, and relay 262 to the power line 208. Energization of the relay 262 causes normally closed contacts 262–1 of relay 262 to open and normally open contacts 262–2 of relay 262 to close. The contacts 262–1 of the relay are in the circuit through the relay 254 which controls the downward movement of the blade and is now opened by whichever of the down limit switches 305 and 309 is open, thus no circuit can be completed through the relay 254 upon the closing of relay contacts 262–1.

The closing of contacts 262–2 of relay 262 causes a circuit to be completed from the power line 201 through now closed contacts 262–2 of relay 262, conductor 263 and solenoid 265 to power line 208. Solenoid 265 is connected to valve 270, as aforementioned and energization of the solenoid 265 causes the valve 270 to be moved to the right, as viewed in FIG. 9, causing hydraulic fluid to be pumped through the conduits 225, valve 270, conduit 272, into the hydraulic cylinder 273 of valve 226.

Actuation of the hydraulic cylinder 273 of the valve 226 causes the valve 226 to move to the right, as viewed in FIG. 9. This causes the hydraulic fluid to be pumped through the conduit 225, valve 226, conduit 227, check valve 193, conduit 192 and into the bottom of the hydraulic cylinder 31, causing the piston head 33 therein to move upwardly. Hydraulic fluid, of course, moves out of the top of the hydraulic cylinder 31 through conduit 190, into the bottom of the hydraulic cylinder 30, causing the piston head 32 therein to move upwardly, and fluid then flows out of the top of hydraulic cylinder 30, through conduit 280, check valve 282, conduit 283, valve 226, conduit 232 and valve 233 into the reservoir. This causes the blade A to move upwardly.

The initial upward movement of the blade A causes cam 223 to move away from switch 309, allowing the switch to close. As the blade reaches its up position cam 223 will actuate switch 221 to open the contacts thereof and de-energize the relay 262. De-energization of the relay 262 causes normally closed contacts 262–1 thereof to close and normally open contacts 262–2 thereof to open. Opening of the contacts 262–2 causes solenoid 265 to be de-energized, thereby allowing valve 270 to return to its center position. When the valve 270 returns to its center position fluid flows from hydraulic cylinder 273 of valve 226 through conduit 272, valve 270 and conduit 292 into the reservoir. The valve 226 is thereby allowed to return to its center position and the upward movement of the blade A stops. At this time the hydraulic fluid pumped by pump 214 into conduit 225 and to valve 226 is returned to the reservoir from valve 226 through conduit 232 and check valve 233.

Figure 11:
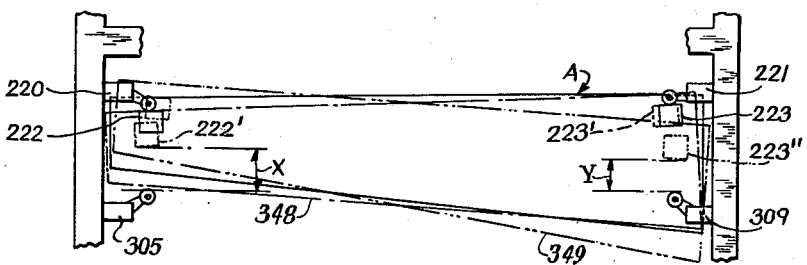
FIG. 11 is a diagrammatic view of a portion of the shear of FIG. 1 illustrating the movable blade thereof at different rake angles.

The above description of the operation of the shear was made assuming that the blade was at its normal maximum rake angle. When the blade is at a rake angle which is less than the normal maximum, that is, when the left end of the blade as viewed in FIGS. 1, 9 and 11 is lower relative to the right end, for example, in the position shown in dot-dash lines 348 of FIG. 11, the operation of the shear is substantially the same. If the change in rake angle is substantial, the down limit switch 305 will function in place of down limit switch 309 to stop the downward movement of the blade A at the end of the down or working stroke of the blade. When the blade is at rest in its topmost position and at a rake angle less than the normal maximum rake angle, piston 32 is lower than piston 33 and cam 222 will be spaced below switch 220 an amount depending upon the new rake angle, for example the position designated 222′ in FIG. 11. When the operator depresses the foot pedal switch 295 the shear operates as above described and the blade moves downwardly. Since cam 222 is now lower than cam 223, cam 222 will engage and open down limit switch 305 before cam 223 reaches switch 309. The opening of down limit switch 305 de-energizes the relay 254, stops the downward movement of the blade A and causes the blade to move upwardly, as above described. As the blade moves upwardly cam 223 engages switch 221 to break the circuit to relay 254, and as above described, the blade stops its upward movement. It will be observed that the length of the stroke of the blade A will be shortened in proportion to the reduction in rake angle.

When the blade is at a rake angle which is greater than the normal maximum rake angle shown in FIG. 9, that is, when the left end of the blade, as viewed in FIGS. 1, 9 and 11, is higher relative to the right end, for example, in the position shown in double dot-dash lines 349 of FIG. 11, the operation of the shear is substantially the same as described above. In this event, however, up limit switch 220 functions to determine the up position of the blade A instead of switch 221 as the cam 223 is located below the switch 221, for example, in the position designated 223″ in FIG. 11. With the blade A in its up position piston 33 is lower than piston 32 and switch 220 is engaged by cam 222 and hold open thereby, preventing relay 262 from becoming energized. When the operator depresses foot pedal 295 the shear will operate, as above described, and blade A will move downwardly. Since cam 223 is lower than cam 222, cam 223 will engage switch 309, opening the switch 309, de-energizing the relay 254, stopping the downward movement of the blade A and causing it to move upwardly, as above described. As the blade moves upwardly cam 222 will engage switch 220 to break the circuit to relay 254 and as above described, the blade will stop its upward movement.

A suitable adjustable pressure relief valve 385 is provided in the hydraulic system and which connects conduit 225 to the sump or reservoir 224. This valve is adjusted to open when the blade is moving and an undesired pressure build-up occurs in conduit 225. When the blade is at rest, check valve 233 serves as a pressure relief valve.

The hydraulic system described includes numerous valves which are set to open at desired pressures. The settings of these valves vary depending on the size of the shear in which the hydraulic system is used. Valve 194, of course, must be set to hold the blade A in its topmost position. The pressure setting of this valve is determined by the weight of the blade and attached parts that must be held up. Reducing valve 333 is set to control the pressure with which the hold-down devices engage the material to be cut. The vale 346 is set to open after the hold-down devices engage the material and valve 344 is set to open at a slightly lower pressure than valve 346, as above described. Valve 233 opens at a pressure lower than valves 194 and 346, but at a pressure which is sufficient to provide pilot pressure for operating valves 226 and 286. The pressure relief valve 385 is set open at a pressure appreciably greater than the pressure at which any of the other valves open.

As previously described, the hydraulic cylinders 30 and 31 are connected in tandem, that is, the bottom of cylinder 30 is connected by conduit 190 to the top of cylinder 31. A certain volume of hydraulic fluid is normally trapped by the valve 191 between the bottom of the piston head 32 in cylinder 30 and the top of piston head 33 in cylinder 31. This volume is referred to hereinafter as the trapped volume.

When the ram is moving vertically upwardly or is at rest in its topmost position the rake angle, that is, the angle formed by the movable knife with respect to the stationary knife, can be changed by rotating the crank 60 to move cam 124 and actuate switch 120 or 121, as aforementioned. The actuation of these switches controls the operation of valve 191 to cause fluid to be added to or subtracted from the trapped volume, depending on whether switch 120 or 121 is actuated, which in turn changes the rake angle.

Assuming that the movable knife is in its topmost position and at any rake angle, the operator, as above described, by rotating crank 60 in a direction which winds the flexible wire 91 onto the sheave 90, can effect an increase in the rake angle. Winding the wire 91 onto sheave 90 causes cam 124 to move to the left, as viewed in the drawings, and actuate switch 120. Actuation of switch 120 closes the contacts 390 and 391 thereof. This completes a circuit from the power line 201 through now closed contacts 390 and 391 of switch 120, conductor 392, normally closed contacts 254-4 of relay 254, conductor 393, and solenoid 395 to the power line 208. The solenoid 395 is connected to the valve 191, and energization of the solenoid 395 causes the valve 191 to move to the right. Movement of the valve 191 to the right causes fluid to be added to the aforementioned trapped volume. The fluid is pumped by the pump 215 through conduit 285, valve 286, conduit 287, valve 191, and conduit 190 into the trapped volume. This additional fluid tends to force piston 32 upwardly and piston 33 downwardly. As the rake angle increases the sheave 97 raises relative to sheave 94, thereby slackening the wire 91 and permitting the cam 124 to return to its neutral position, which allows switch 120 to open.

Since it was assumed that the blade A is at rest, the piston 32 cannot move upwardly because the fluid in the top of cylinder 30 will not flow therefrom. This fluid will tend to move through conduit 280, check valve 282, conduit 283, but valve 226 is in its center position, which blocks flow of the fluid through the valve. The fluid from the top of cylinder 30 also will tend to flow from conduit 283 through check valve 284 into conduit 285. This, however, does not occur because the pressure of pump 215 maintains check valve 284 in a closed position. This fluid added to the trapped volume will therefore force piston 33 downwardly causing the fluid in the bottom of cylinder 31 to flow through conduit 192, valve 194, conduit 227, valve 226, conduit 232 and valve 233 into the reservoir.

If the rake angle at this time is greater than that herein referred to as the normal maximum rake angle up limit switch 220 will be open and the right-hand end of the blade will continue to move down until the cam 124 recenters or returns to its normal inoperative position, thus allowing switch 120 to reopen and re-energizes solenoid 395, thus allowing valve 191 to recenter.

If the blade is at its normal maximum rake angle or at any rake angle less than its normal maximum rake angle, when piston 33 moves downwardly cam 223 moves out of engagement with switch 221 allowing the switch to close. This completes a circuit, as previously described, from conductor 246 through relay 262 to power line 208. Energization of relay 262 closes contacts 262-2 thereof completing a circuit from line 201 through solenoid 265 of pilot valve 270 to line 208. Energization of solenoid 265 causes valve 270 to move to the right, thereby causing fluid to be pumped through conduit 225, valve 270 and conduit 272 into cylinder 273 of valve 226, moving valve 226 to the right. When valve 226 moves to the right, fluid is pumped through conduit 225, raising both pistons 30 and 31, as described hereinabove, because the fluid above piston 32 in cylinder 30 can now flow therefrom through conduit 280, check valve 282, conduit 283, valve 226, conduit 232, and valve 233 into the reservoir. This operation continues until cam 124 returns to its neutral or central position with one of the up limit switches 220 and 221, open, depending upon whether the new rake angle is more than the normal maximum rake angle, or whether it is the same or less than the normal maximum rake angle. If the new rake angle is less than the normal maximum rake angle valve 226 may be actuated to cause upward movement of the blade several times, as above described, before the new rake angle is reached. This is particularly possible if the desired change in the rake angle is great. In such a situation cam member 223 may open switch 221 a number of times before switch 120 opens. If such is the case the above described operation will occur repeatedly before switch 120 opens.

If the operation rotates crank 60 to effect an increase in rake angle while the blade A is moving up the last operation explained continues until one or the other of the switches 220, 221 opens, depending upon whether the new or adjusted rake angle is made or less than or the same as the normal maximum rake angle, with the cam 124 returned to its neutral or normal position and the switch 120 open.

When the blade A is in its topmost position, at rest and at any rake angle, rotation of crank 60 in a direction which causes the wire 91 to wind off of the sheave means 90 and slacken causes cam member 124 of the rake angle controller means 99 to move to the right, as viewed in FIG. 9, thereby actuating switch 121 to decrease the rake angle. Actuation of the switch 121 completes a circuit from power line 201 through now closed contacts 405 and 406 of switch 121, conductor 407, now closed contacts 254-5 of relay 254, conductor 408 and solenoid 410 to line 208.

The solenoid 410 is connected to valve 191 and energization of solenoid 410 causes the valve to be moved to the left, as seen in FIG. 9. This connects fluid conduit 287 which is under pressure to conduit 291 and through check valve 290 to conduit 280, thereby applying a pressure on the top of piston 32. Since valves 226 and 284 block the flow of this fluid through conduit 283, as previously explained, this pressure fluid moves the piston head 32 downwardly, causing fluid to move out of the bottom of cylinder 30 through conduit 190 and return through valve 191 and conduit 288 to the sump or reservoir 224. This subtracts fluid from the trapped volume. If the blade is at its normal maximum rake angle or less this fluid does not enter the top of the cylinder 31, since the fluid under the piston head 33 in the cylinder 31 is maintained therein by the action of the valves 194 and 193, and the left-hand end of blade A, as viewed in FIG. 9, will be lowered. When the left portion of the blade A moves down the sheave 97 lowers relative to sheave 94. This relative movement results in tensioning the wire 91, and when the relative movement is sufficient the cam member 124 is returned to its neutral position, and switch 121 is opened de-energizing solenoid 410 and stopping the flow of hydraulic fluid to the top of cylinder 30 and the subtraction of fluid from the trapped volume.

If the blade A is at a rake angle greater than its normal maximum rake angle limit switch 220 will be functioning as the up limit switch and downward movement of the piston head 32 and in turn the left-hand end of the blade A will move the cam 222 away from the switch causing the switch 220 to close and the valve 226 to be actuated, as previously described to move the blade A in an upward direction. When the blade A is moving upwardly the valve 191 is moved to the left and directs hydraulic fluid through conduit 291, check valve 290, and into the conduit 280 tending to increase the pressure above piston 32 in cylinder 30 but since valve 226 is in its left-hand position this pressure is determined by the setting of valve 233. During the upward movement of the blade hydraulic fluid is supplied to the bottom of the hydraulic cylinder 31 and the hydraulic fluid in the top of hydraulic cylinder 31 forced therefrom flows through the conduit 190, valve 191 and conduit 288 into the reservoir rather than into the bottom of cylinder 30 because the pressure in conduit 190 is low compared to that in conduit 280.

The result of this action is that the piston in the cylinder 31 moves upwardly relative to the piston in the cylinder 30, thereby causing the right end of the blade as viewed in FIG. 9, to move upwardly relative to the left end. This action causes sheave 94 to move upwardly relative to sheave 97 and creates tension in the wire 91. After sufficient relative movement of sheaves 94 and 97, the wire 91 returns the member 124 to its neutral position and switch 121 reopens, de-energizing solenoid 410 and stopping the flow of fluid through valve 191. If the blade A is not then in its top position it continues to move up in its normal manner until one or the other of the up limit switches 220 and 221 is opened, depending upon the value of the new rake angle.

If the switch 121 is actuated by winding the wire 91 off of the sheave 90 while the blade A is moving upwardly the valve 191 will be actuated and the trapped volume will be subtracted from, as just described, until the new rake angle is reached and if the blade is not then in its up position it will continue to move up in the normal manner until one or the other of the up limit switches 220 and 221 is opened, depending upon the value of the new rake angle.

Upon reference to FIG. 10 it will be apparent that the rake adjustment can only be performed when the blade A is moving up or when the blade is at rest in its topmost position. This is because the normally closed contacts 254-4 and 254-5 of the blade down relay 254 are in the circuits for energizing the solenoids 395 and 410, respectively, which actuate the valve 191 to adjust the rake angle. When the relay 254 is energized these contacts are opened and no circuit can be completed to the solenoids 395 and 410. The relay 254 is energized when the ram is moving downwardly. At all other times the relay 254 is de-energized and the contacts 254-4 and 254-5 are closed.

If for any reason during the downward movement of the blade the attitude of the blade is altered by faulty operation of the shear thereby causing cam 124 to move to the right or left a sufficient distance to actuate switch 122 or 123, respectively, the blade will stop and an alarm 417 will be energized. If switch 122 is engaged by cam 124, contacts 240 and 241 thereof will be opened and contacts 240 and 415 thereof will be closed. The opening of contacts 240 and 241 will break the circuit to relay 254 which stops blade motion. Closing of contacts 240 and 415 completes a circuit from line 201 through now closed contacts 240 and 415 of switch 122, conductor 416 and alarm 417 connected to line 208. The alarm 417 may be of any suitable nature and preferably is a light to indicate faulty operation of the shear. It is apparent that if switch 123 is engaged by cam 124 contacts 243 and 244 thereof open causing the blade to stop moving and energizing alarm 417 by closing contacts 243 and 418 and completing a circuit from line 201 through contacts 240 and 241 of switch 122, conductor 242, contacts 243 and 418 of switch 123, conductor 416 and alarm 417 to power line 208.

It is apparent that if for any reason switch 122 or 123 is energized by cam 124 when the blade is at rest or moving vertically, the alarm 417 will again be energized. Since relay 254 is de-energized at this time, switch 120 or 121 will also be energized by cam 124 which switches control the valve 191 to move the blade to the correct rake angle in the manner described above.

It should be noted that the length of the stroke of the blade is adjusted when the rake angle is adjusted. The cams 222 and 223 which actuate the up and down limit switches 220 and 221 and 305 and 309, respectively, form a control means for controlling the length of the stroke of the blade A. When the blade A is in its topmost position and at its normal maximum rake angle, as previously mentioned, the cam 223 engages switch 221 as cam 222 is slightly below switch 220. When the blade is moved downwardly cam 223 engages switch 309 to stop the downward movement and actuate the upward movement of the blade. When the rake angle is decreased from the normal maximum rake angle, at which the blade A is shown in solid lines in FIG. 11, to another rake angle, for example the rake angle corresponding to the position of the blade shown in dot-dash lines in FIG. 11, the cam 222 is lowered, for example, to the position indicated in dot-dash lines in FIG. 11 and designated 222'. When the cam 222 is in such a position and the blade A moved down cam 222 will engage switch 305 and stop the downward movement of the blade A before cam 223 reaches switch 309. The stroke length would then be the length designated X in FIG. 11. Of course, when blade A moves upward cam 223 actuates switch 221 to stop the upward movement of blade A and condition the shear for the next cycle of operation before cam 222 reaches switch 220. It should be apparent that as long as the rake angle is less than the normal maximum, the cam 222 actuates switch 305 to stop the downward movement of the blade A and the distance through which the cam 222 moves prior to engaging the switch 290 is the stroke length of the blade A which, as is obvious, varies depending on the position of the cam 222.

When the blade A is at a rake angle greater than its normal maximum rake angle, as may be the preferred arrangement when shearing relatively short and thick pieces of material, for example, in the position designated by the double dot-dash lines in FIG. 11, it will be noted that the cam 223, now in a lower position designated 223'', will engage switch 309 to stop the downward movement of the blade before cam 222 can actuate switch 305, and cam 222 will actuate switch 220 before cam 223 can engage switch 221. In this event the stroke length would be the length designated Y in FIG. 11. It is apparent that when the rake angle is greater than the normal maximum, the distance through which cam 223 must move prior to engagement with switch 309 is the stroke length. It should be noted, however, that the rake angle of the shear will normally not exceed the normal maximum as shown in full lines in FIGS. 9 and 11.

An alternative arrangement to that shown in FIGS. 1 to 11 for adjustably supporting the guide assemblies 24 and 25 for the movable blade assembly A is illustrated in FIGURE 12 and 13. In the alternative arrangements the side housings of the frame, only the right hand one of which is shown and designated by the reference character 412, are similar to the side housings 11 and 12 of the previously described embodiment except for the fact that they each include a boss 413 projecting downwardly from the upper side of the throat openings 13 and the pivot pin or stud shafts 68 which carry the sector gears 67 are moved forwardly and positioned in an aperture in the boss 413 in axial alignment with the position occupied by the pivot pin 72 of the first embodiment.

The sector gears 414 of the alternative construction are in all essential respects similar to the sector gear of the first embodiment and have their eccentric hubs rotatably supported on the stub shafts 68 and received in apertures in the guide members 53 similar to the aperture through which the pivot pin 72 projected in the first embodiment. In the instant embodiment, the pivot pins 51 project through apertures 420 in the upper end of the guide members 53, which apertures are elongated in a general vertical direction. In the present instance the apertures 420 are in the form of slots opening into the upper end of the members 53 but it could be an elongated closed aperture. The elongated apertures 420 are provided to permit limited vertical movement of the guide members 53 made necessary by the mounting of the lower ends of the guide members 52 directly to the eccentric parts 415 of the gear sectors 414 rather than being connected thereto by a link, as shown in the first embodiment. The manner of supporting the left hand end of the movable blade assembly A is not shown, but is similar to the manner in which the right-hand end thereof is supported.

The operation of a shear which utilizes the alternative construction described is essentially the same as that of one embodying the first construction and will not be described in detail. Suffice it to say that upon rotation of the shaft 64, the gear sectors 414 at opposite ends of the press will be oscillated to rotate their eccentric hubs upon which the lower ends of the guides for the movable blade assembly are supported. As the eccentrics are rotated, the lower ends of the guides will be moved in a generally horizontal direction to adjust the clearance angle and clearance between the stationary and movable knife members 17 and 21 and as an inherent characteristic of the eccentric, in a generally vertical direction, but this movement is not sufficient to interfere with the proper operation of the shear.

From the foregoing it will be apparent that there has been provided a novel and improved shear especially designed for shearing material of different gauge or thickness and comprising means for quickly adjusting the clearance, clearance angle, rake angle and stroke length. While in the shear shown these adjustments are made simultaneously with reference to a material thickness scale so that the optimum knife relationship can be easily and quickly provided for shearing material of any given gauge or thickness, it is to be understood that the adjustments may be made independent of one another, if desired. In the preferred embodiment the guide means for the reciprocating blade are pivoted to the frame of the shear adjacent to their upper end and the mechanism for adjusting the guide means is connected to the guide means near the bottom thereof. It is to be understood, however, that these connections may be reversed. In this event the adjusting mechanism will merely adjust the clearance angle and other provisions must be made for adjusting the clearance between the knives such as moving the guide means or the work-table or work support horizontally. If desired, this movement can be accomplished simultaneously with the other adjustments by suitable means, either mechanical or electrical. If performed electrically, the electric control system may include a selsyn system.

I claim:

1. In a shear for cutting material of different thicknesses, a frame, a support member mounted in said frame and adapted to support a first knife member, an elongated member movable in said frame through a cycle of operation which includes a work stroke and a return stroke, said elongated member being adapted to carry a second knife member inclined at a rake angle to a first knife member on said support member and in position to cooperate with a first knife member on said support member to shear material placed therebetween, means for moving said elongated member through said cycle of operation, guide means for guiding said elongated member along a predetermined path when moving through said cycle of operation, means movably mounting said guide means in said frame, and means for simultaneously changing the rake angle of a second knife member on said elongated member and for moving said guide means to change the path of movement of said elongated member.

2. In a shear for cutting material of different thicknesses, a frame, a support member mounted in said frame and adapted to support a first knife member, an elongated member movable in said frame through a cycle of operation which includes movement from a rest position through a work stroke and a return stroke, said elongated member being adapted to carry a second knife member inclined at a rake angle to a first knife member on said support member and in position to cooperate with a first knife member on said support member to shear material placed therebetween, power means for moving said elongated member through said cycle of operation, means for changing the rake angle of a first knife member, carried by said elongated member and means for preventing operation of said last named means when said elongated member is moving through its work stroke.

3. In a shear for cutting material of different thicknesses, a frame, a support member mounted in said frame and adapted to support a first knife member, an elongated member movable in said frame through a cycle of operation which includes movement through a work stroke and a return stroke, said elongated member being adapted to carry a second knife member inclined at a rake angle to a first knife member on said support member and in position to cooperate wtih a first knife member on said support member to shear material placed therebetween, power means connected to said elongated member for moving said elongated member through said cycle of operation, and means for changing the rake angle of a second knife member mounted on said elongated member simultaneously changing the length of said work and return strokes.

4. In a shear for cutting material of different thicknesses, a frame, a support member mounted in said frame and adapted to support a first knife member, an elongated member movable in said frame through a cycle of operation which includes movement from a rest position through a work stroke and a return stroke, said elongated member being adapted to carry a second knife member in position to cooperate with a first knife member on said support member to shear material placed therebetween, a plurality of double acting reciprocating type hydraulic motors connected to said elongated member adjacent to the opposite end thereof for moving said elongated member and a second knife member carried thereby through said cycle of operation, means for operating said motors to move opposite ends of said elongated member relative to each other to change the rake angle of a knife member carried thereby, and means for preventing operation of said last named means when said elongated member is moving through its work stroke.

5. In a shear for cutting material of different thicknesses, a frame, a support member mounted in said frame and adapted to support a first knife member, an elongated member movable in said frame through a cycle of operation which includes a work stroke and a return stroke, said elongated member being adapted to carry a second knife member, in position to cooperate with a first knife member on said support member to shear material placed therebetween, a plurality of hydraulic motors connected to said elongated member for moving said elongated member through said cycle of operation, means for guiding the movement of said elongated member when moving through said cycle of operation, and means for simultaneously changing the clearance between a first knife member on said support member and a second knife member on said elongated member and the rake angle of a second knife member supported by said elongated member.

6. In a shear for cutting material of different thicknesses, a frame, a support member mounted in said frame and adapted to support a first knife member, an elongated member movable in said frame through a cycle of operation which includes a work stroke and a return stroke, said elongated member being adapted to carry a second knife member in position to cooperate with a first knife member on said support member to shear material placed therebetween, a plurality of double acting reciprocating type hydraulic motors connected to said elongated member adjacent opposite ends thereof for moving said elongated member through said cycle of operation, guide means for guiding the movement of said elongated member when moving through said cycle of operation, means for simultaneously adjusting said guide means and said support member relative to one another to provide predetermined clearance and clearance angle between a first knife member on said support member and a second knife member on said elongated member and for adjusting said elongated member to provide a predetermined rake angle of a second knife member supported by said elongated member, and means for changing the length of said work and return strokes upon effecting a change of said rake angle.

7. In a shear for cutting material of different thicknesses, a frame, a support member mounted in said frame and adapted to support a first knife member, an elongated member movable in said frame through a cycle of operation which includes a work stroke and a return stroke, said elongated member being adapted to carry a second knife member in position to cooperate with a first knife member on said support member to shear material placed therebetween, a plurality of double acting reciprocating type hydraulic motors connected to said elongated member adjacent opposite ends thereof for moving said elongated member through said cycle of operation, guide means for guiding the movement of said elongated member when moving through said cycle of operation, means for movably mounting said guide means in said frame, means for simultaneously positioning said guide means to provide a predetermined clearance and clearance angle between a first knife member on said support member and a second knife member on said elongated member and for positioning said elongated member to provide a predetermined rake angle of a second knife member supported by said elongated member and for changing the length of said work and return strokes.

References Cited by the Examiner

UNITED STATES PATENTS 2,645,287  7/53  Munschauer _____ 83—635

FOREIGN PATENTS 616,457  3/61  Canada.

ANDREW R. JUHASZ, *Primary Examiner.*